Dec. 21, 1937.   I. E. BLACK ET AL   2,103,213
CONTAINER SEALING MACHINE
Filed Dec. 29, 1934   8 Sheets-Sheet 1

Inventors
Irving E. Black
Henry B. Silver
Frederick J. Hoffer,
By
Attorneys

Dec. 21, 1937.  I. E. BLACK ET AL  2,103,213
CONTAINER SEALING MACHINE
Filed Dec. 29, 1934   8 Sheets-Sheet 2

Inventors
Irving E. Black
Henry B. Silver
Frederick J. Hoffer,
By
Attorneys

Dec. 21, 1937.  I. E. BLACK ET AL  2,103,213
CONTAINER SEALING MACHINE
Filed Dec. 29, 1934   8 Sheets-Sheet 3

Inventors
Irving E. Black
Henry B. Silver
Frederick J. Hoffer
By
Attorneys Dec. 21, 1937.   I. E. BLACK ET AL   2,103,213
CONTAINER SEALING MACHINE
Filed Dec. 29, 1934   8 Sheets-Sheet 4

Inventors
Irving E. Black
Henry B. Silver
Frederick J. Hoffer,
By
Attorneys Dec. 21, 1937.  I. E. BLACK ET AL  2,103,213
CONTAINER SEALING MACHINE
Filed Dec. 29, 1934  8 Sheets-Sheet 6

Inventors
Irving E. Black
Henry B. Silver
Frederick J. Hoffer
By
Attorneys

Patented Dec. 21, 1937

2,103,213

UNITED STATES PATENT OFFICE 2,103,213

CONTAINER SEALING MACHINE

Irving E. Black, Frederick J. Hoffer, and Henry B. Silver, Brooklyn, N. Y., assignors to Plastic Seal Corporation, Brooklyn, N. Y., a corporation of New York Application December 29, 1934, Serial No. 759,784

36 Claims. (Cl. 226—80)

The present invention relates to container sealing machines, and more particularly to the type of machine in which a ribbon of viscous sealing material is discharged by a nozzle about the joint between the cap or other closure and body or neck of a container to be sealed.

The principal object of this invention is to provide a novel machine which will apply such a ribbon completely about the joint, and this is accomplished by producing a ribbon having ends that overlap.

Another object is to provide novel means for regulating the discharge of the sealing fluid to apply an exact amount to each container, thus avoiding waste, and assuring an adequate amount of fluid for effective sealing.

Still another object is to provide novel means for automatically centering the closure of the container and novel means for automatically clamping the container being sealed during the operation, and releasing it at the proper time.

Another object is to provide a nozzle so arranged that air will not be trapped beneath the ribbon of fluid applied to a container.

A still further object is to provide a nozzle which will accurately preform the ribbon of fluid to fit the configuration of the container and closure and the joint between them.

These objects are attained by a machine in which a container is sealed by fluid discharged in a preformed ribbon under pressure from a nozzle during relative rotation between the container and the nozzle. In order to assure sealing completely around the container, the rotation during which fluid is discharged, is through more than three hundred and sixty degrees, this resulting in an overlapping of the ends of the ribbon applied to the container. Such a ribbon when dried forms a continuous band about the joint and effectively seals the container. This sealing during rotation through more than a complete circle is accomplished by what may be termed a "throwback" of the nozzle prior to each sealing operation, the delivery of sealing fluid beginning when the nozzle starts its forward rotation. Automatic valve operating mechanism is provided to control the starting and stopping of delivery of fluid to the nozzle at the proper time; and a measuring pump designed to deliver a definite quantity of material during a certain period is used to supply the proper quantity for each operation. Means for centering the closure is operated before the throwback period, and means is operated during this period to clamp the bottle and retain it during the entire sealing period when the container is automatically released.

In the preferred embodiment of the invention the machine is supported by a base 25 which also supports the motor 26 for driving the machine. An arm 27 supports the fluid reservoir 28 to one side of the machine.

Figure 8:
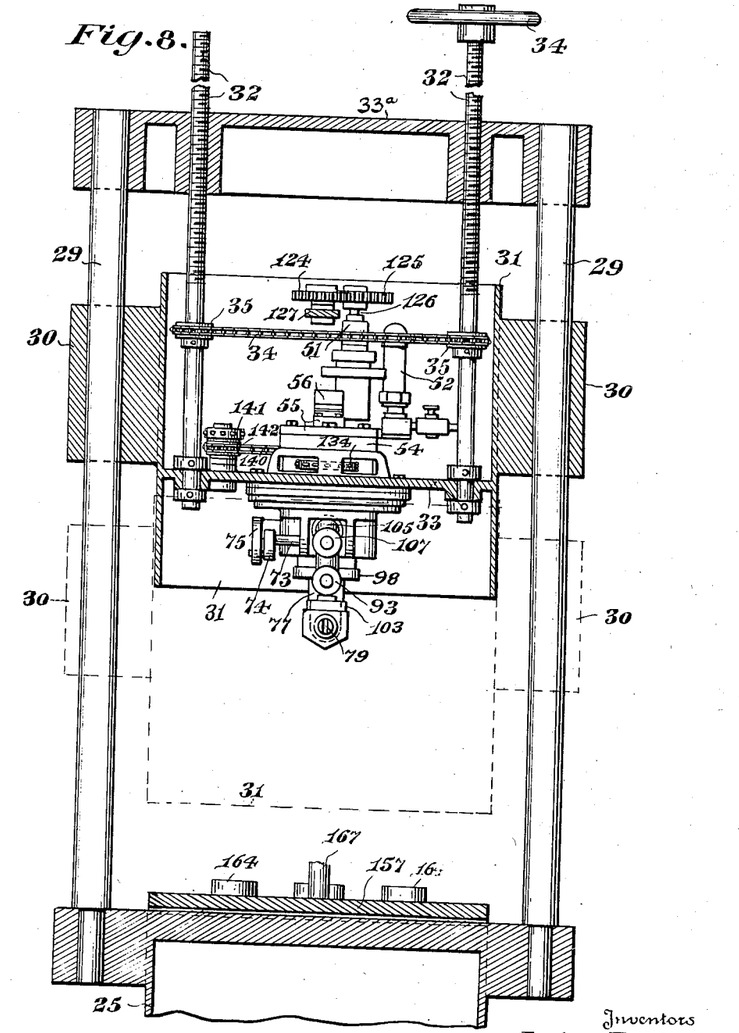
Figure 8 is a sectional view on line 8—8 of Figure 2.

From the base 25, heavy rods 29 extend upwardly, the rods 29 being slidably engaged by split clamping guides 30 attached to a casing 31 in which is the sealing mechanism. In order to raise and lower the casing 31 to operate upon containers of different heights threaded rods 32 are journaled at their lower ends in a horizontal partition 33, as shown in Figure 8, these rods engaging threaded bosses in a horizontal yoke 33a supported at the top of the machine by the guide rods 29. One of the rods 32 is extended and bears a hand wheel 34 by which it may be turned and the rods are operatively connected together by a sprocket chain 34 engaging a sprocket wheel 35 on each of the rods.

Figures 1, 18:
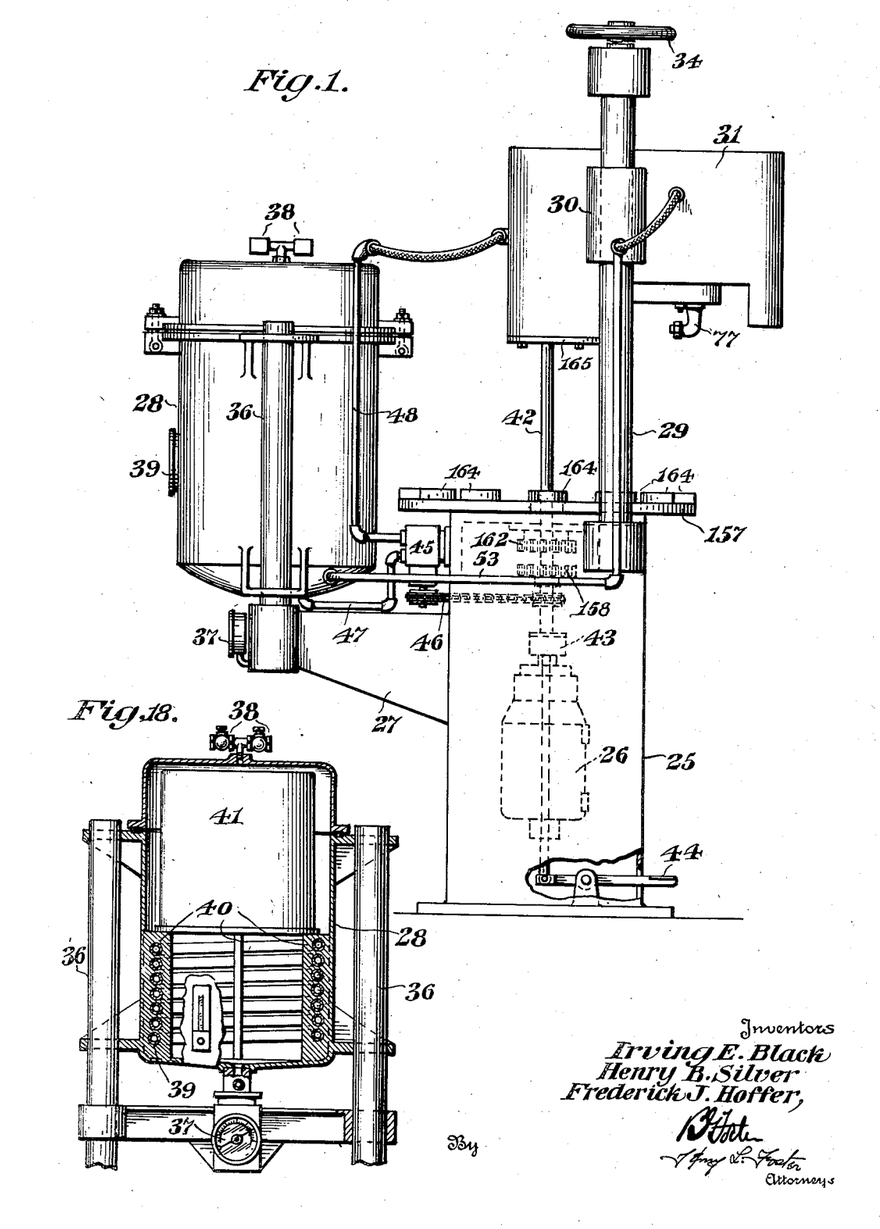
Figure 1 is an elevation of the machine.
Figure 18 is a sectional view of the sealing fluid reservoir.

The reservoir 28 is adjustably supported on rods 36, in turn supported by the bracket 27, and consists of a body portion and a hinged cover, a gasket being interposed to seal the opening. In order to indicate the amount of material in the reservoir, a gauge may be attached as at 37, this gauge preferably being of the hydraulic type and operated by the weight of the reservoir and fluid therein. Relief valves 38 for releasing excessive internal pressure and permitting entrance of air as the fluid is withdrawn may be provided. Thermostatically controlled heating coils of any suitable type, indicated at 39, may be used if necessary, depending on the viscosity of the particular fluid in the reservoir. The reservoir is large enough to contain a considerable quantity of fluid, and is equipped with internal ribs 40 upon which an opened can may be placed in inverted position to drain its contents. Such a can, designated 41, is shown in Figure 18.

The motor 26 drives a main drive shaft 42 through a clutch 43 operated by a foot pedal 44. This clutch is preferably of a type that, when engaged, can be disengaged only at a time when the machine is not performing a sealing operation.

Mounted upon the base 25 is a constantly running feed pump 45 driven by shaft 42 through a sprocket chain 46. The feed pump draws fluid from the reservoir through a pipe line 47 and delivers it by way of a pipe line 48 to a filter 49 within the casing 31, from which it is delivered by a pipe 50 to the measuring pump 51. In order to allow adjustments, the pipes may be either flexible or may be rigid and flexibly jointed, all connections being air-proof to prevent drying of the fluid in the system.

The measuring pump 51 is preferably of the type described in application, Serial No. 705,434, and is designed to deliver a definite amount of fluid during each revolution thereof. The measuring pump 51 is intermittently driven by means which will be described later. The feed pump 45 is constantly driven to supply sealing fluid for the intermittently operating measuring pump. To accommodate the fluid during the rest periods of the measuring pump, a relief valve 52 is connected with the pipe 50 between the filter 49 and the pump 51, the relief valve discharging into a by-pass 53, which returns the excess fluid to the reservoir 28. The relative capacities and speeds of the pumps 45 and 51 are such that when the measuring pump 51 is operating an excess will be supplied by the feed pump 45, thus insuring an ample supply of fluid for the measuring pump.

The sealing mechanism proper is mounted within the casing 31 and supported by the horizontal partition 33. A casing 54 is suitably secured to the partition 33 in an opening in the partition. The casing has a cover member 55 which supports the measuring pump 51, the base 56 of which rests upon it. The measuring pump 51 is supplied with sealing fluid by way of a passage 50a in the base 56, connecting with the pipe 50, and delivers it through a passage 50b. Suitable gaskets preferably are interposed between the casing 54 and cover 55, and the cover 55 and base 56 of the pump.

Figures 2, 2A, 10A:
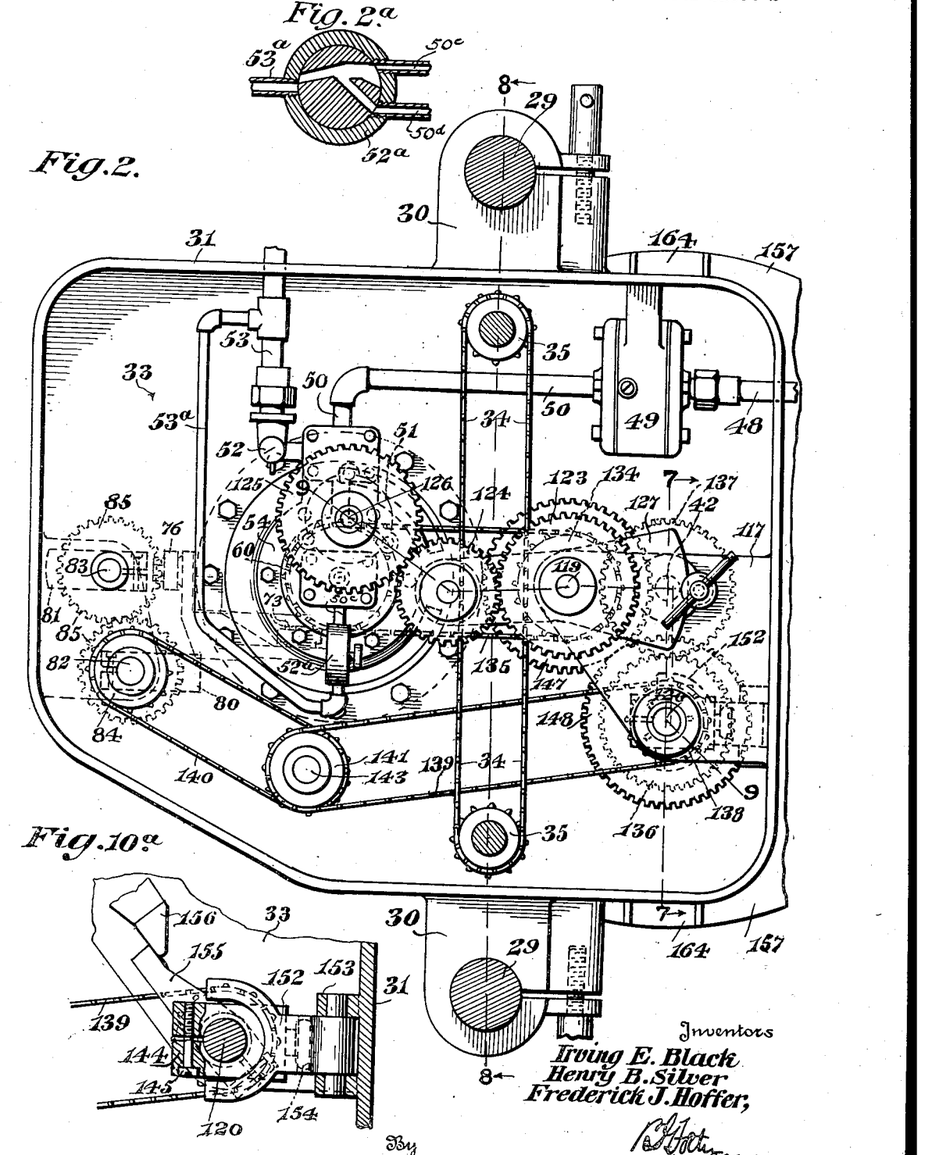
Figure 2 is a plan view of the sealing mechanism of the machine.
Figure 2a is a sectional detail view of the manually adjustable by-pass valve.
Figure 10a is a sectional view on line 10a—10a of Figure 6.

To provide for an easily made manual adjustment of the exact amount of fluid delivered by the measuring pump 51, to the fluid delivery nozzle, an adjustable by-pass valve 52a may be connected to the delivery passage 50b by means of a pipe 50c, its delivery connected to the fluid delivery line by a pipe 50d, and its excess discharge connected to the by-pass pipe 53 by a connection 53a. This valve, shown in Figure 2a is a plug valve so arranged that as the connection with the delivery pipe 50a is closed, the connection with the pipe 53a is opened, so that as the feed to the nozzle is decreased, the amount returned to the reservoir by the connection 53a is increased.

Revolubly mounted within the casing 54 is a hollow shaft 58 having a head 59 at its lower end. A sprocket wheel 60 is mounted upon the shaft 58 for driving the same. Within the hollow shaft 58, and extending vertically above it through the cover member 55 to the base 56 is a shaft 61 having a bore 62. The bore 62 connects with the discharge 50d of the by-pass valve 52a, and from it receives fluid supplied by the pump 51. Suitable packing 65, held by a packing nut 66, is inserted between the shaft 61 and the shaft 58. The lower face of the packing nut 66 is above the bottom surface of the head 59, leaving a chamber 67 below the nut.

Mounted upon the bottom of the head 59 and revoluble therewith is a plate 68 having at one side a nozzle bracket 69, and connecting the chamber 67 with a plurality of discharge ports 70, is a passage 71, controlled by a rotatable valve 72. A suitable gasket is preferably interposed between the head 59 and the plate 68.

Figures 5, 11, 12:
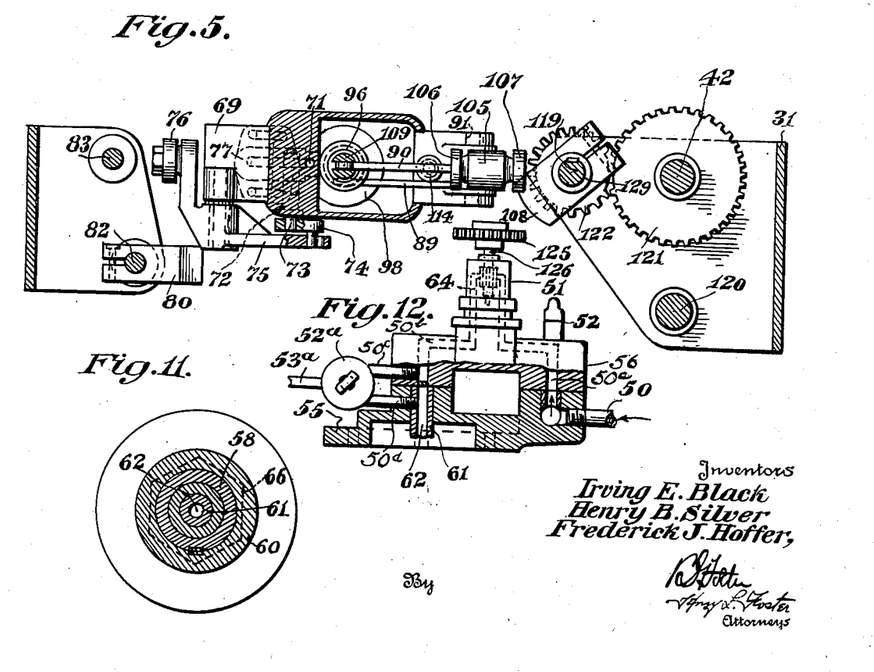
Figure 5 is a sectional view on line 5—5 of Figure 3.
Figure 11 is a sectional view on line 11—11 of Figure 6.
Figure 12 is an elevation of the measuring pump.

The valve 72 is controlled through a stem 73 (see Figure 5) having a link 74 mounted thereon, the link being operated by a lever 75 having a roller 76 on its outer end. The roller 76 engages with rotating cams by means of which the valve 72 is properly operated to permit the passage of fluid during the operation of sealing a container and to stop it when the operation is completed. The valve prevents fluid in the passage from flowing out of the nozzle between sealing operations.

A nozzle 77 having a passage 78 is slidably mounted upon the nozzle bracket 69, the passage 78 registering with any one of the ports 70 and the others being suitably plugged. The three ports and the sliding mounting permit adjustment for containers of different diameters, and such adjustment may be controlled by a screw 77a. A discharge tip 79 is mounted upon the nozzle in a manner to permit easy detachment to allow interchange of different tips suitable for the formation of different types of ribbons of sealing fluid.

The nozzle tips which are used in the sealing of ordinary sized containers, as distinguished from very small containers requiring extremely narrow ribbons of fluid, are preferably constructed as follows. The discharge member is formed of two duplicate semi-cylindrical parts 79b (see Figures 19 and 20), carefully machined on their meeting surfaces to form a fluid tight joint. A tapered slot 79c is machined in each member 79b to form a fluid passage 79d, and the taper being toward the front of the members 79b, where it merges into a discharge orifice 79f. The taper of the passage is varied at different points to exert predetermined resistance to the passage of fluid, in order to form a ribbon of proper thickness at all points. The front of the member 79 is profiled to conform to the configuration of the portions of the container and cap to be covered by the ribbon, with the exception that the lower portion 79g of the nozzle tip preferably recedes from the container, leaving a downwardly increasing space between the container and the discharge member. Surrounding the two sections 79b is a split clamping ring 79h which holds them together. Behind the slot 79c the members 79b are bored to receive a bushing 79i having a flanged end, by means of which it is clamped against the end of the nozzle 77 by a threaded ring 77b. The bushing has a bore 78a adapted to register with the bore 78 of the nozzle.

The profile of the discharge member causes the ribbon to be preformed in the proper cross sectional shape to fit closely the cap and the container and over the joint between them, when it comes into contact with them, forming an exceedingly impermeable seal.

Figures 7, 16, 17, 19, 20, 21, 22:
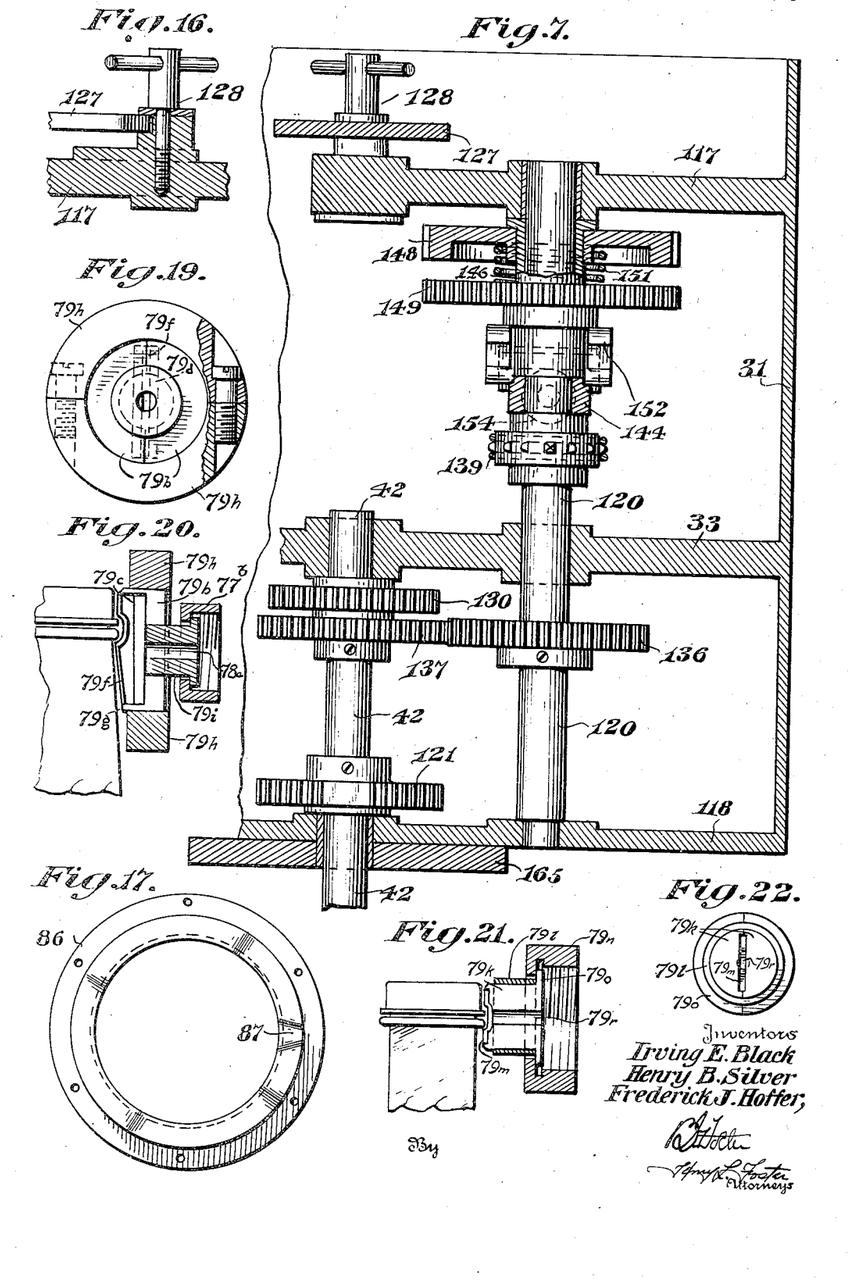
Figure 7 is a sectional view on line 7—7 of Figure 2.
Figure 16 is a sectional view showing the method of clamping the adjustable support for the idler gear of the measuring pump drive.
Figure 17 is a plan view of the cam controlling the operation of the container clamping mechanism.
Figure 19 is a front elevation of one form of nozzle tip.
Figure 20 is a sectional view of the same.
Figure 21 is a sectional view of a modified nozzle tip.
Figure 22 is a front elevation of the same.

The modification shown in Figures 21 and 22 is intended for use with small containers where a very narrow ribbon is required. In this form the discharge member, although it might be formed in one piece, is preferably formed of two duplicate parts 79k, held together by a ring 79l shrunken to hold them together. In such a construction, the front of the discharge member is slotted as at 79m to provide for spreading the fluid to form the ribbon, and it is profiled to conform to the configuration of the container and cap. In this modification a ring 79n, threaded to engage the nozzle 77, may engage a flange 79o at the rear of the member 79k, which member has a bore 79r to register with the passage 78 of the nozzle 77.

In order to present an understandable description of the mechanism for operating the valve 72 and that for centering and clamping the container in position, a brief description of the operation of the sealing mechanism above described will be given here, a description of the drive being given later.

After one sealing operation is completed, a container is brought into position by conveying means and automatically centered with respect to the shaft 58 which is the center of the rotating parts. Sealing takes place during rotation in one direction of the shaft 58 and other members rotating with it. Prior to the beginning of the sealing operation, the sealing mechanism is rotated in a reverse direction for a small distance, no fluid being discharged from the nozzle during this reverse rotation which is the "throwback" motion. The clamping and centering mechanisms for holding the container operate before the short reverse rotation and the container remains clamped during the sealing. Then the rotation in the forward or sealing direction begins, and coincidentally with this forward rotation, fluid is discharged.

When the nozzle has returned to its first position, and sealing is completed, before the next rearward motion, the container is released and carried away and a new operation begins.

The valve 72 is controlled by two rotating cams 80 and 81, the former or lower cam 80 acting to depress the lever 75 to open the valve at the time the forward rotation of the sealing mechanism begins, and the latter or upper 81 acting to raise the lever 75 and close the valve at the end of the forward motion, the valve remaining closed during the short rearward rotation.

The cams 80 and 81 are mounted respectively on shafts 82 and 83 and the closing cam 81 is rotatably adjustable on its shaft 83 in respect to the position in which it contacts the roller 76, this adjustment serving to provide for an early or late closing of the valve 72. Shaft 82 is driven by a sprocket wheel 84 and drives shaft 83 through spur gears 85.

The mechanisms for centering the container closure in sealing position, and for clamping the containers in place, are constructed as follows: Upon the partition 33, and surrounding the head 59, is a stationary cam track 86 having a single dwell 87 therein. A bracket 88, secured to and revolving with the head 59, supports a lever 89 for centering the container cap, and a lever 90 for clamping the container in position during the sealing operation. These levers may be mounted upon a common pivot 91.

The lever 89, which operates the closure centering device, has a rear arm 92, which bears a roller 93 adapted to be engaged by a rotary cam 94 which raises the rear arm and depresses the forward arm. The end of the forward arm of the lever 89 engages a collar 96 slidably mounted on a tubular member 97 which is slidable vertically in a support 98 carried by the bracket 69. Surrounding the tubular member 97 is a spring 99 bearing against the collar 96 at its upper end, and at its lower end against an enlarged shoulder 100 of the tubular member. Between the shoulder 100 and the support 98 is another spring 101 which urges the tubular member upward. The tubular member 97 is keyed against relative rotation with the support 98 by a key 102. The container closure centering cup 103 is removably attached to the tubular member, and may be replaced by other cups to suit different sizes and styles of closures. The cup 103 is slotted at 104 to prevent its contact with the nozzle tip. When the nozzle has an extension higher than the top of the container cap, as is sometimes necessary, for instance, when it is desirable to form the ribbon extending onto the top of the container cap, the centering cup 103 would strike the nozzle if not slotted. In use the machine is operated when a container is not in position, the slot prevents damage to the nozzle by the cup.

When the forward arm of the lever 89 is depressed by the cam operating through roller 93 and the arm 92, it depresses the collar 96 against the spring 99 which urges the tubular member downwardly against the spring 101. The cup 103 is lowered, centering the container with respect to the sealing nozzle. As soon as the cam 94 has passed from under the roller, the parts are returned to their former position, shown in Figure 6, by the spring 101. The above-described centering mechanism operates just before the beginning of the throwback period.

Inasmuch as it is sometimes necessary to form a ribbon which overlaps the container cap and extends onto the top thereof, clamping means for the container are provided which engage the central portion of the cap, but do not engage or closely approach the edge thereof. In order to firmly grip the container, vacuum gripping means may be employed. One form is disclosed, though others may be used if desired.

The clamping lever 90 has a rear bell-crank arm 105 which bears on opposite sides two rollers, one of which 106 engages the stationary cam 86, and the other of which 107 is adapted to be engaged by a rotary cam 108. The forward end of the lever 90 engages a headed plunger 109, the stem of which is within the bore of a tube 110 which is slidable within the tubular member 97. The plunger 109 and the tube 110 are not keyed together, but are held against relative vertical motion by a split ring 111 inserted into the channel formed by grooves cut in the stem of the plunger and the wall of the tube respectively. The lower end of the tube 110 bears a rubber vacuum cup 113 adapted to grip the top of a container closure when pressed against it. The forward arm of the lever 90 is urged upwardly to its unclamping position by a spring 114 seated in a socket in an extension 115 of the bracket 88.

The clamping devices above described operate when the throwback period begins. During the period when a container is being brought to position, the sealing mechanism is at rest, and during this time, the roller 106 lies in the dwell 87 of the cam 86. When the throwback motion begins, the lever 90 being carried by the head 59 and rotating with it, the roller 106 rides out of the dwell 87 and the forward arm of the lever 90 is depressed, moving downwardly the plunger 109, tube 110, and pressing the vacuum cup 113 against the container closure, shown as a cap 116.

The container is clamped during the entire sealing operation from the beginning of the throwback operation and during rotation from the extreme throwback position during a complete revolution and beyond the throwback position to the point where the roller 106 reenters the dwell 87. In order to allow the roller 106 to pass the dwell 87 during the sealing operation when it passes starting position, the roller 107 on the opposite side of the crank arm 105 from the roller 106, and the rotating cam 108 are provided. The cam 108 is adjusted so that its highest point lies in the path of the roller 107 at the time that the roller 106 is passing the dwell 87 in the cam track 86. When the sealing operation is complete and the roller 106 again approaches the dwell, the cam 108 is out of position to prevent its entry into the dwell, and the spring 114 acts to return the lever to its non-clamping position, pulling with it the plunger 109 and, by means of the ring 111, the tube 110 and vacuum cup 113.

In order to drive the various mechanisms heretofore described, a system of gears, shafts and sprockets is employed.

Figures 3, 10:
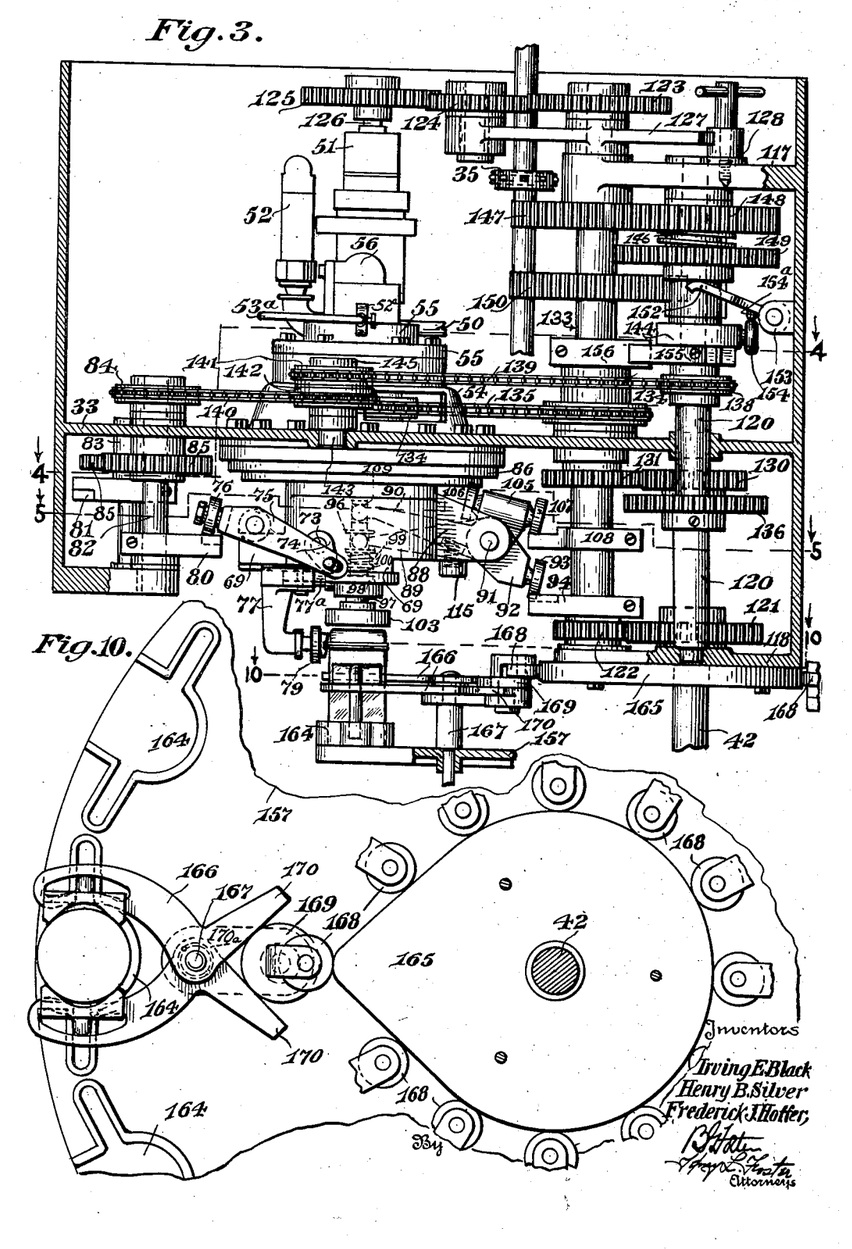
Figure 3 is an elevation of the sealing mechanism of the machine.
Figure 10 is a sectional view on line 10—10 of Figure 3.
Figure 4:
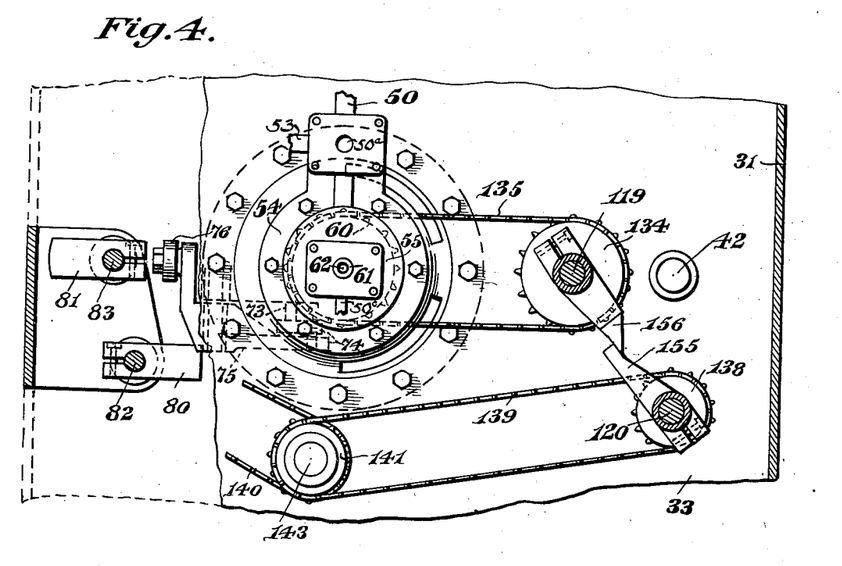
Figure 4 is a sectional view on line 4—4 of Figure 3.
Figures 6, 13, 14, 15:
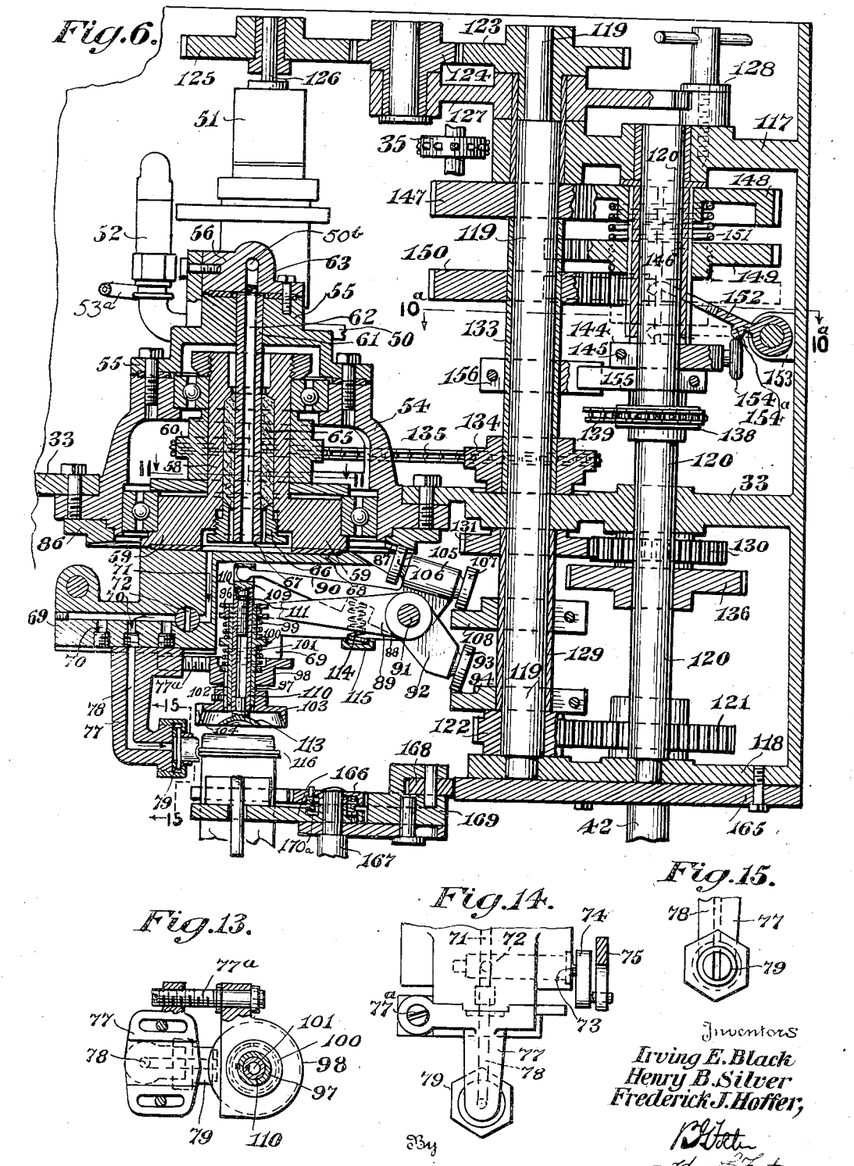
Figure 6 is a sectional elevation of the sealing mechanism.
Figure 13 is a plan view of the nozzle and the adjustable support therefor.
Figure 14 is an elevation of the nozzle and a portion of its supporting bracket.
Figure 15 is a view of the nozzle taken on line 15—15 of Figure 6.
Figure 9:
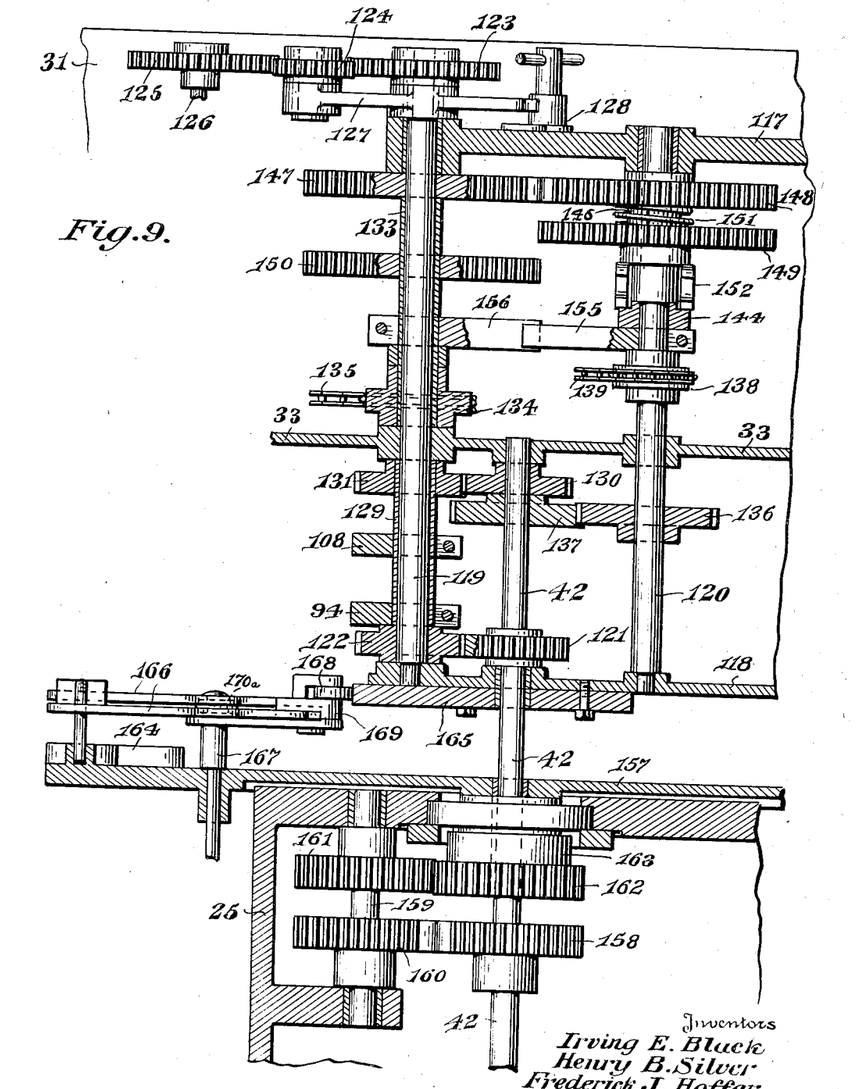
Figure 9 is a view taken on line 9—9 of Figure 2.

Inasmuch as there are three shafts in relatively triangular relation and in each of the detailed Figures 3, 6 and 7, one or another of the shafts falls directly behind one of the remaining two, for the sake of clarity reference is made to Figure 9.

Within the casing 31 and respectively above and below the partition 33 are shelf-like supports 117 and 118, which support bearings for the various shafts. The main drive shaft 42 runs in bearings in support 118 and partition 33, immediately above which it terminates. Adjacent the main drive shaft is a shaft 119 which is hereafter termed the "intermediate shaft", and a third shaft 120 termed the "counter-shaft". The positions of these shafts is shown in plan in Figure 2.

The intermediate shaft 119 is driven from the main drive shaft 42 by a driving gear 121 mounted on the main drive shaft 42 meshing with a gear 122 mounted near the lower end of the intermediate shaft. These gears 121, 122 are mutilated in order to give intermittent rotation to the intermediate shaft 119. At its upper end, the intermediate shaft carries a gear 123 from which the measuring pump is driven by a train of gears.

The train of gears driving the measuring pump 51 comprises an idler gear 124 and a driven gear 125 mounted on the drive shaft 126 of the measuring pump. The gear 125 is readily demountable to permit different sized gears to be substituted when it becomes necessary, because of a change in the size of containers being operated upon, or for other reasons, to change the speed of the pump and the consequent amount of fluid delivered by it. To allow for different sized gears, the support 127 for the idler gear 124 is centrally for rotation pivoted about the intermediate shaft 119 to allow for different sized gears to be substituted for gear 125, and is adapted to be secured in position by a clamp 128 upon the support 117.

Surrounding the lower portion of the intermediate shaft 119 and rotatable relative thereto is a short hollow shaft 129. This hollow shaft 129 is continuously driven from the main drive shaft 42 by a driving spur gear 130 and a driven spur gear 131. Mounted upon the hollow shaft 129 for rotation therewith are the cams 94 and 108 for operating the container cap centering and container clamping mechanisms.

The intermediate shaft 119 supports a second hollow shaft 133 surrounding the intermediate shaft and rotatable relative thereto. The hollow shaft is vertically supported by a suitable bearing upon the partition 33. A sprocket wheel 134 mounted on the hollow shaft 133 drives the shaft 58 and consequently the sealing mechanism, by means of a sprocket chain 135 engaging the sprocket wheel 60.

The counter-shaft 120 is driven from the main drive shaft 42 by a gear 137 mounted on the main drive shaft and meshing with a gear 136 mounted on the counter-shaft. A sprocket wheel 138 upon the constantly rotating counter-shaft drives the sprocket 84, through which the valve controlling cams 80 and 81 are driven by means of sprocket chains 139 and 140 which respectively drive and are driven by idler sprockets 141 and 142 mounted upon an idler shaft 143 (see Figures 2 and 3).

The hollow shaft 133, which drives the sealing mechanism, is driven in the following manner. A split block 144 is clamped upon the counter-shaft 120 by screw 145, and this block 144 supports a hollow splined shaft 146 surrounding the shaft 120 and rotatable with respect thereto. The splined shaft 146 is driven from the intermediate shaft 119 by gears 147 and 148 mounted upon the intermediate and splined shafts respectively. The gears 147 and 148 are mutilated in order to give the shaft 146 intermittent rotation.

Slidingly mounted for vertical reciprocation between upper and lower positions on the splined shaft 146 is a driving spur gear 149, adapted when in its lower position, to mesh with a driven gear 150 mounted upon and secured to the hollow shaft 133 which it drives. A spring 151 is interposed between the gears 148 and 149 and urges the gear 149 to its lower and meshing position.

Beneath the gear 149 is a lever 152 having a forked end engaging the underside of the gear 149 and having its other end pivoted to a bracket 153 upon the wall of the casing 31 (see Figure 3). The lever 152 is moved upwardly to raise the gear 149 by a roller 154 mounted on the block 144 and consequently rotating with the counter-shaft 120, the roller operating against a cam projection 154a upon the lever 152.

Below the block 144 an arm 155 is mounted upon and rotates with the counter-shaft 120. This arm operates to produce the throwback motion of the sealing mechanism by engaging an arm 156 upon the hollow shaft 133 at the time when the gear 149 is in its upper position and out of mesh with the gear 150, and through the arm 156, driving the hollow shaft 133 in a direction reverse to that in which it is driven by the gear 149. This reverse motion is relatively brief and is transmitted to the sealing mechanism by the sprocket chain 135.

Containers are delivered to the sealing mechanism by a dial type conveyor and this conveyor is provided with automatic centering devices for properly positioning the containers beneath the cap centering cup.

The dial 157 (see Figure 9) is suitably mounted for rotation on the top of the base 25. It is intermittently driven from the main drive shaft 42 by a mutilated gear 158 driving an idler shaft 159 through the driven gear 160. The idler shaft drives by means of a spur gear 161, a gear 162 secured to the hub 163 of the dial, which hub extends through a bearing inserted in an opening in the top of the base. The main drive shaft passes through a bore in the hub and is not in contact with the hub or dial.

About the outer edge of the dial 157 is a series of cavities 164 adapted to hold containers conveyed by the dial.

In order to center the containers with respect to the cap-centering cup 103, a heart-shaped cam 165 is rigidly secured to the underside of the support 118, the point of the cam being in line with the center of the cap-centering cup 103. For each cavity 164, a pair of tongs 166, supported on a rod 167 is provided. The rods 167 are adjustable to raise and lower the tongs for containers of different sizes. Each pair of tongs is operated by a roller 168 engaging the periphery of the cam 165, the roller being connected to a spreader 169 reciprocating in and out between and bearing against the rearward arms 170 of the tongs, and thus operating to close the jaws of the tongs and allow them to open under the influence of springs 170a. The point of the cam 165, being in line with the center of the cap-centering cup, the tongs are closed when the container is beneath the cup, and as the tongs are rigid, the container is positively positioned in spite of any variation in the container positioned in a cup 164, due to unevenness of the container base, dirt on the dial or other cause.

Containers are loaded onto the dial and removed therefrom in any suitable manner.

A sealing operation takes place as follows:

The dial brings a container, which is centered by the tongs 166, into sealing position beneath the centering cup and stops, due to its intermittent driving gear 158 until the sealing operation is complete. At this time the machine is in the following condition, the counter-shaft 120 and the hollow shaft 129 rotating, the intermediate shaft 119 and the hollow shafts 133 and 146 stationary, the gear 149 in mesh with the gear 150, and valve 72 closed. As the hollow shaft 129 rotates, cam 94 engages the lever 89 and lowers the cap centering cup 103 which engages the cap of the container and centers it relative to the nozzle.

At this time the gear 149 is raised out of mesh with the gear 150, after which the arm 155 engages the arm 156, causing the throwback motion of the sealing mechanism through the hollow shaft 133 and sprocket chain 135. At the beginning of this motion the lever 90 is depressed, lowering the container-clamping vacuum cup 113 and pressing it against the container cap. This is the only time that the centering and clamping cups are together in contact with the closure of the container. Cam 94 now moves away and the centering cup 103 is raised, the clamping cup 113 remaining engaged with the closure. When the throwback motion is complete, the roller 154 passes from under the lever 152 and the gear 149 meshes with the gear 150, locking the sealing mechanism against movement so that when the cam 80 driven from the constantly rotating counter-shaft 120 opens the valve 72, the cam will not move the head 59 out of position.

After the valve 72 has been opened, the gear 122 is rotated by the gear 121, and drives the intermediate shaft, driving the measuring pump through gears 123, 124, 125, and through gears 147, 148, 149, and 150, driving the hollow shaft and consequently the sealing mechanism in its forward direction. The roller 106 is allowed to pass the dwell 87 due to the action of the cam 108 upon the roller 107. When the sealing mechanism has completed one operation, the cam 81 closes the valve 72, the rotation of the intermediate shaft ceases, and the roller 106 enters the dwell 87 of the cam track 86, releasing the container. Now the dial starts moving, carrying away the sealed container while the tongs are released, and a new container is being positioned for the next operation.

It will be noted that the gear 149 is raised out of mesh with the gear 150, slightly before the container is finally centered, and before the throwback motion is made, the nozzle and sealing mechanism during the period between the completion of one sealing operation and the beginning of the next throwback motion being stationary and inactive due to the formation of the intermittent gears driving them.

It will be understood that all of the intermittent gears are so formed and related that the operations of the various mechanisms of the machine are properly timed to cooperate in the manner indicated.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What we claim is:

1. In a container sealing machine having a container support and means for discharging sealing fluid about the joint between a container and its closure upon the container support, said support and discharging means being relatively movable, and means for causing relative movement between the container support and the discharge means, first in one direction and thereafter in another direction.

2. In a container sealing machine having a container support and means for discharging sealing fluid about the joint between a container and its closure upon the container support, said support and discharging means being relatively rotatable, and means for causing relative rotation between the container support and the discharging means, first in one direction and thereafter in another direction.

3. In a container sealing machine having a container support and a nozzle rotatable about a container upon the support and adapted during rotation in one direction to discharge fluid about the joint between the container and its closure, means for rotating the nozzle in one direction, and means for initially rotating the nozzle for a limited period in the reverse direction.

4. In a container sealing machine having a container support, a nozzle, said nozzle and support being relatively rotatable, and intermittently operating means for supplying sealing fluid to the nozzle during said relative rotation in one direction, and means for causing the relative rotation in an opposite direction for a limited distance during the time the fluid supplying means is inactive.

5. The combination with a sealing nozzle movable in opposite directions, of means for intermittently driving it in one direction, and means for causing a reverse movement of the nozzle when the intermittent driving means is inactive.

6. In a container sealing machine having a container support, a nozzle rotatable about a container upon the support, a pump for supplying sealing fluid to the nozzle, and means for intermittently driving the pump and the rotatable nozzle, means operating during the idle periods of the intermittent pump, and nozzle driving means for causing limited reverse rotation of the nozzle.

7. In a container sealing machine having a container support and a nozzle rotatable about a container upon the container support and adapted to discharge sealing fluid about the joint between such container and its closure, intermittently operating gears for driving the nozzle in one direction, and means for driving the nozzle in the opposite direction during periods of inactivity of the intermittent gears.

8. In a container sealing machine having a container support and a relatively rotatable nozzle adapted to deliver sealing fluid about the joint between a container and its closure on the support, clamping means for the container movable with the nozzle relatively to the support, a relatively stationary cam track adapted to operate the clamping means having a releasing dwell, means for causing intermittent relative rotation of the nozzle and support in one direction, in combination with means for initially causing relative rotation of the support and nozzle in a reverse direction and causing the clamping means to be operated during said reverse movement, and means for maintaining the clamping means in operation when passing the releasing dwell of the cam track during the movement succeeding the reverse movement.

9. In a container sealing machine having a container support and a nozzle adapted to deliver sealing fluid about the joint between the container and its closure upon the container support, said support and nozzle being relatively rotatable, said nozzle having a passageway for delivering fluid to the nozzle, a valve controlling the passage of fluid through the passageway, and means operated by the relative rotation of the nozzle and container support for controlling the valve.

10. In a container sealing machine having a container support and a nozzle bracket rotatable about a container upon the container support and having a fluid passageway therein, a valve controlling the passageway, a lever for operating the valve, and means in the path of the lever as the nozzle bracket rotates for causing the lever to operate the valve.

11. In a container sealing machine having a container support, a nozzle supporting bracket having a fluid passage therein, a valve controlling the passage, and a lever operating the valve, means for driving the nozzle bracket in a forward direction and for initially driving it a brief distance in the reverse direction, a rotary cam for engaging the lever at the beginning of the forward motion to open the valve, and a second rotary cam to engage the lever at the end of the forward motion to close the valve.

12. In a container sealing machine having a container support, the combination with container clamping mechanism mounted on the container support, and means for engaging the closure of a container upon the support and positioning the same, of a vacuum cup for engaging the said closure and holding it in position during the operation of the machine.

13. In a container sealing machine having a container support and intermittently operating sealing mechanism, mechanism for clamping a container in position for sealing, the said clamping mechanism including a movable centering cup for engaging the closure of a container upon the container support, a vacuum cup movable relative to the centering cup, means for moving the centering cup and the vacuum cup into engagement with the container closure and for removing only the centering cup prior to the operation of the sealing mechanism, and means for disengaging the vacuum cup after the operation of the sealing mechanism.

14. In a container sealing machine having a container support and means for applying sealing fluid about the joint between a container and its closure, a closure centering device, and means for operating the centering device prior to the operation of the fluid applying means.

15. In a container sealing device, a nozzle for shaping and applying a ribbon of sealing fluid about the joint between a container and its closure, the said nozzle having a discharge orifice in its front face and having the said face about the orifice profiled to substantially conform to the configuration of the container and closure in proximity to the joint between them.

16. In a container sealing device, a nozzle for shaping and applying a ribbon of sealing fluid about the joint between a container and its closure, the said nozzle having a discharge orifice in its front face and having the said face about the orifice profiled to substantially conform to the configuration of the container and closure in proximity to the joint between them, and that portion of the face of the nozzle opposite the container receding from the surface of the container as it approaches the part most distant from the joint.

17. In a container sealing device, a nozzle for shaping and applying a ribbon of sealing fluid about the joint between a container and its closure, the said nozzle having a forwardly tapered fluid passage therein terminating in a discharge orifice in the front face of the nozzle, the front face of the nozzle about the discharge orifice being profiled to substantially conform to the configuration of the container and closure in proximity to the joint.

18. In a container sealing device, a nozzle for shaping and applying a ribbon of sealing fluid about the joint between a container and its closure, the said nozzle having a tapered rectangular fluid passage therein terminating in a discharge orifice in the front face of the nozzle, the front face of the nozzle being profiled to substantially conform to the configuration of the container and cap in proximity to the joint between them, and the taper of the passage being varied to exert predetermined resistance to the passage of fluid to the different points of the profiled face.

19. In a container sealing machine having means for applying sealing fluid about the joint between a container and its closure, means for positioning and holding a container with respect to the fluid applying means, and means for positioning the closure with respect to the fluid applying means.

20. In a container sealing machine having means for applying sealing fluid about the joint between a container and its closure, means for positioning and holding a container with respect to the fluid applying means, means for positioning the closure with respect to the fluid applying means, and additional means engaging the container closure for holding the container and closure in position during the application of the fluid.

21. In a container sealing machine, intermittently operating means for applying sealing fluid about the joint between a container and its closure, and means adjacent the fluid applying means for positioning the container with respect to the fluid applying means and prior to the operation thereof, the said positioning means moving out of the way of the fluid applying means before the operation thereof begins.

22. In a container sealing machine having a container support and a nozzle for applying sealing fluid about the joint between a container and its closure upon the container support, the said support and nozzle being relatively rotatable, means adapted to engage the closure for centering the closure with respect to the nozzle, said means being movable out of the way of the nozzle.

23. In a container sealing machine having a container support and a nozzle for applying sealing fluid about the joint between a container and its closure upon the container support, the said support and nozzle being intermittently and relatively rotatable, means for centering the closure with respect to the nozzle and adapted to engage the closure during the inactive period of the relatively rotatable nozzle and support, said means being movable out of the way of the nozzle before the commencement of the relative rotation.

24. In a container sealing machine having a container support and a nozzle for applying sealing fluid about the joint between a container and its closure upon the container support, the said support and nozzle being intermittently and relatively rotatable, means for centering the closure with respect to the nozzle and adapted to engage the closure during the inactive period of the relatively rotatable nozzle and support, said means being movable out of the way of the nozzle before the commencement of the relative rotation, and container clamping means adapted to engage the central portion of the closure during the relative rotation.

25. In a container sealing machine having a container support and means for applying sealing fluid about the joint between a container and its closure upon the container support, the said fluid applying means and support being relatively rotatable, and means for causing intermittent relative rotation initially for less than one revolution in one direction and then for more than one complete revolution in another direction between the support and the fluid applying means.

26. In a container sealing machine having a container support and a nozzle rotatable about a container upon the container support for applying sealing fluid about the joint between the container and its closure, and means for intermittently causing the nozzle to rotate for a predetermined distance of less than one revolution in one direction and then for more than one complete revolution in an opposite direction.

27. In a container sealing machine having a container support and a nozzle rotatable about a container upon the support, mechanism for driving the nozzle including a main drive shaft, an intermediate shaft driven intermittently by the main drive shaft, a counter-shaft steadily driven by the main drive shaft, a hollow shaft surrounding the intermediate shaft and rotatable relatively thereto, means for driving the said hollow shaft intermittently from the intermediate shaft, and means for driving the hollow shaft from the counter-shaft in a reverse direction during the inactive period of said intermittent driving means, and driving connections between the hollow shaft and the rotatable nozzle.

28. In a container sealing machine having a container support, and a nozzle rotatable about a container upon the container support, driving mechanism including a main drive shaft, an intermediate shaft, means for intermittently driving the intermediate shaft from the main drive shaft, a counter-shaft constantly driven by the main drive shaft, a hollow shaft surrounding a portion of the counter-shaft and rotatable with respect thereto, means for intermittently driving the hollow shaft from the intermediate shaft, a hollow shaft surrounding a portion of the intermediate shaft and rotatable with respect thereto, a shiftable driving gear upon and revolving with the hollow shaft surrounding the counter-shaft and meshing with a driven gear upon the hollow shaft surrounding the intermediate shaft, means for periodically shifting the driving gear out of mesh with the driven gear when the intermediate shaft is at rest, means mounted upon the constantly driven counter-shaft for driving the hollow shaft surrounding the intermediate shaft in a reverse direction while the shiftable driving gear is out of mesh with the driven gear, and driving means connecting the hollow shaft surrounding the intermediate shaft and the nozzle.

29. In a container sealing machine having a container support, a nozzle rotatable about a container upon the container support, a pump for supplying sealing fluid to the nozzle by way of a passage, a valve controlling the flow of fluid through the passage, means for controlling the valve, means for centering a container closure with respect to the nozzle, and means for clamping a container during the sealing operation, driving mechanism including a main drive shaft, an intermediate shaft, means for intermittently driving the intermediate shaft from the main drive shaft, driving means connecting the intermediate shaft and the pump, a hollow shaft bearing means for controlling the operation of the closure centering and container clamping means and surrounding a portion of the intermediate shaft and rotatable with respect thereto, means for constantly driving the hollow shaft from the main drive shaft, a counter-shaft, means for constantly driving the counter-shaft from the main drive shaft, driving means connecting the counter-shaft and the valve controlling means, a hollow shaft surrounding a portion of the counter-shaft, means for intermittently driving the hollow shaft from the intermediate shaft, a shiftable driving gear mounted on and revolving with the hollow shaft, means for shifting the said gear, a second hollow shaft mounted upon the intermediate shaft and rotatable with respect thereto, a driven gear mounted upon the second hollow shaft and meshing with the shiftable gear in one of the latter's positions, means mounted upon the counter-shaft for driving the second hollow shaft upon the intermediate shaft in a reverse direction in the period when the shiftable gear is out of mesh with the driven gear, and driving means connecting the second hollow shaft upon the intermediate shaft and the rotatable nozzle.

30. A nozzle for container sealing machines including a front face having a discharge orifice therein, the said front face being profiled to substantially conform to the configuration of a container and its closure in proximity to the joint between them.

31. A nozzle for container sealing machines comprising a body having a fluid passage therein and a discharge orifice, and a face surrounding the discharge orifice profiled to substantially conform to the configuration of a container and its closure in proximity to the joint between them.

32. A nozzle for container sealing machines comprising a body having a tapered transversely elongated fluid passage therein, and a discharge opening, the said passage tapering inwardly toward an elongated discharge opening, and the face of the nozzle about the discharge opening being profiled to substantially conform to the configuration of a container and its closure in proximity to the joint between them.

33. A nozzle for container sealing machines comprising a body having a tapered transversely elongated fluid passage therein and a discharge opening, the said passage tapering inwardly toward an elongated discharge opening, the face of the nozzle about the elongated discharge orifice being profiled to substantially conform to the configuration of a container and its closure in proximity to the joint between them, and the taper of the fluid passage being varied to exert predetermined resistance at different points of the passage to regulate the flow of fluid to the discharge orifice.

34. A nozzle for container sealing machines comprising a longitudinally divided body composed of two substantially duplicate parts having slots therein forming a transversely elongated fluid passage terminating in a discharge orifice, and a clamping ring surrounding and securing together the parts of the body.

35. A nozzle for container sealing machines comprising a longitudinally divided body composed of two substantially duplicate parts having slots therein forming a transversely elongated fluid passage terminating in a discharge orifice, a bushing inserted in the body and having an inlet passageway therein connecting with the transversely elongated fluid passage, and a clamping ring surrounding and securing together the parts of the body.

36. A nozzle for a container sealing machine including a body having a fluid passage therethrough and an elongated discharge slot in the front face of the body and connected to the fluid passage, the front face of the body about the discharge slot being profiled to substantially conform to the configuration of a container and its closure in proximity to the joint between them.

IRVING E. BLACK.
HENRY B. SILVER.
FREDERICK J. HOFFER.